United States Patent [19]
Lasker

[11] 3,817,138
[45] June 18, 1974

[54] STEAK OR MEAT CUTTING ASSEMBLY

[76] Inventor: Adolphe H. A. Lasker, 426 Scotia St., Winnipeg, Manotoba, Canada

[22] Filed: Aug. 30, 1972

[21] Appl. No.: 285,071

[52] U.S. Cl. ................................. 83/466.1, 83/762
[51] Int. Cl. .................................... B26d 7/02
[58] Field of Search ..................... 83/466.1, 762

[56] References Cited
UNITED STATES PATENTS
| | | | |
|---|---|---|---|
| 937,611 | 10/1909 | Kawasaki | 83/466.1 |
| 2,398,192 | 4/1946 | Scheminger, Jr. | 83/762 |
| 3,452,795 | 7/1969 | Davies | 83/762 |

*Primary Examiner*—Willie G. Abercrombie
*Attorney, Agent, or Firm*—Stanley G. Ade

[57] ABSTRACT

A board supports the steak or meat and a guide box overlies the board and holds the meat firmly. Slots in the guide box permit a knife to cut through the meat onto the board. The box is then removed and turned 90° and further cuts made thus cutting the steak or meat substantially into cubes for use in kebab cooking, stews, or the like.

1 Claim, 5 Drawing Figures

PATENTED JUN 18 1974　3,817,138

STEAK OR MEAT CUTTING ASSEMBLY

BACKGROUND OF THE INVENTION

This invention relates to new and useful improvements in cutting board assemblies specifically designed for use with steak or the like which is required to be cut into substantially equal pieces when used, for example, in kebab cooking, the preparation of stews, or beef bourguignonne or the like.

It is relatively difficult to cut raw meat, particularly beef, into equal cubical pieces which are required not only to produce even cooking time but also for aesthetic purposes.

When steak, for example, is used in the preparation of kebabs, it is desirable that substantially cubical pieces of steak be prepared having similar dimensions and the present device facilitates the preparation of meat for this purpose.

SUMMARY OF THE INVENTION

A cutting board is provided with an overlying guide box having a plurality of slots formed therein so that when the box is in position, the lower ends of the slots extend below the upper surface of the board thus ensuring the knife can pass clear through the meat to the board below. The guide box holds the meat firmly upon the board and the distance between adjacent slots is substantially equal to the distance between the underside of the upper surface of the box and the upper surface of the board so that by making one set of cuts in one direction and then removing the box and turning it through 90°, and repeating the cutting action, substantially cubical pieces of meat are prepared having similar dimensions.

It is desirable that the opposite ends of the box or the ends parallel with the slots, be open so that steak of varying lengths can be placed within the box, cut off to size, and then cubed as hereinbefore described.

The principal object and essence of the invention is to provide a guide box and cutting board which facilitates the cubing of steak for various cooking processes.

A yet further object of the invention is to provide a device of the character herewithin described which is preferably made of clear plastic so that the cutting operation can be viewed at all times.

A still further object of the invention is to provide a device of the character herewithin described which is simple in construction, economical in manufacture, and otherwise well suited to the purpose for which it is designed.

With the foregoing objects in view, and such other or further purposes, advantages or novel features as may become apparent from consideration of this disclosure and specification, the present invention consists of the inventive concept which is comprised, embodied, embraced, or included in the means, method, process, product, construction, composition, arrangement of parts, or new use of any of the foregoing, herein exemplified in one or more specific embodiments of such concept, reference being had to the accompanying drawings in which:

BRIEF DESCRIPTION OF THE DRAWINGS

In the drawings like characters of reference indicate corresponding parts in the different figures.

DETAILED DESCRIPTION

Figure 2:
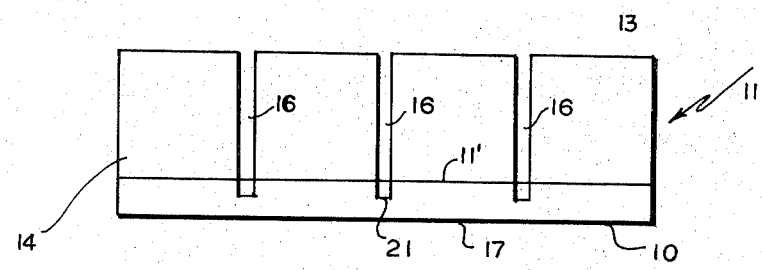
FIG. 2 is a front elevation thereof.
Figure 3:
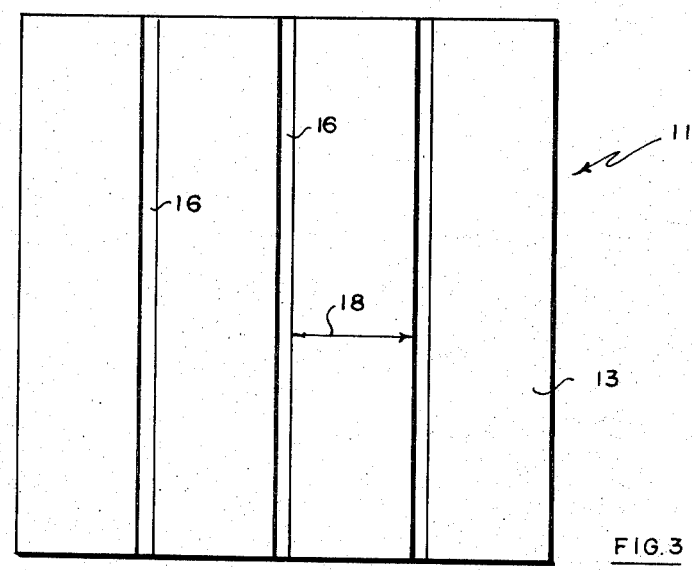
FIG. 3 is a top plan view thereof.

Proceeding therefore to describe the invention in detail, reference character 10 illustrates a substantially rectangular cutting board preferably made of hardwood or the like to avoid excessive damage to the upper surface 11' when in use.

Figure 4:
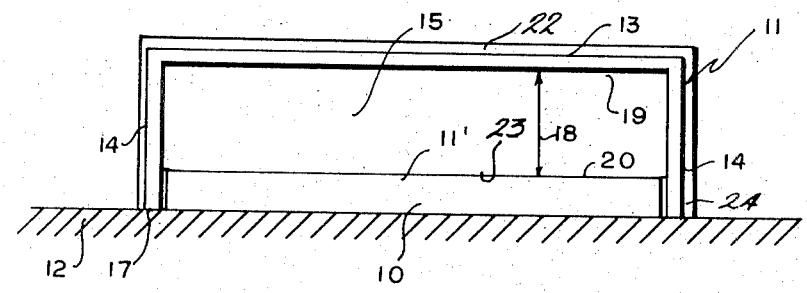
FIG. 4 is an end elevation thereof.

A guide box collectively designated 11 is adapted to freely overlie the cutting board when placed upon a supporting surface 12 as clearly shown in FIG. 4.

This guide box, which is preferably made of clear plastic, includes an upper panel or wall 13 and a pair of opposite end walls 14 depending downwardly therefrom thus providing an open based box having ends 15 at right angles to the end walls 14, also open.

Figures 1, 5:
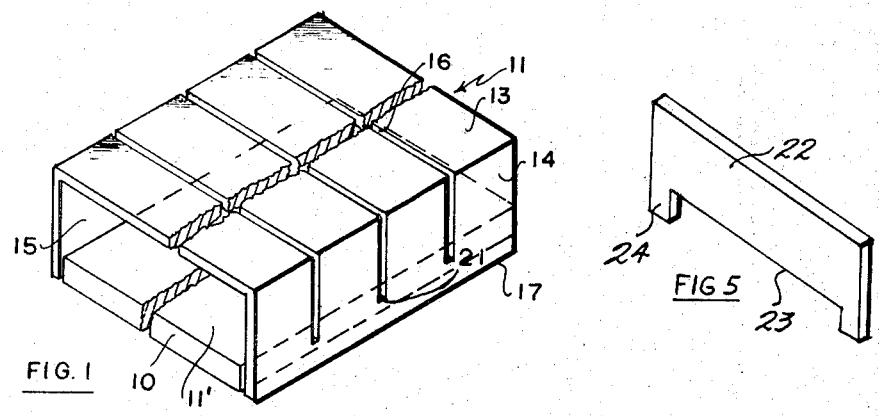
FIG. 1 is an isometric view of the steak or meat cutting assembly.
FIG. 5 is an isometric view of one of the restraining plates.

The plurality of knife guiding slots 16 is formed through the upper wall 13 and downwardly through the opposite end walls 14 terminating spaced from the lower edges 17 of these end walls as clearly shown in FIGS. 1 and 2.

Of importance is the fact that when the guide box is in position upon the board as shown in FIG. 4, the distance 18 between adjacent guide slots 16 is similar to the distance between the underside 19 of the upper wall 13 and the upper side 11' of the board 10.

In use, the board is placed on the supporting surface 12 and the meat to be cut (not illustrated) is then placed upon the board and trimmed to the width of the board so that the guide box can then be engaged over the meat and over the board with the lower edges 17 of the end walls 14 engaging the supporting surface 12.

Downward pressure is preferable so that the meat is compressed slightly during this operation thus holding same firmly.

Meat extending from the open ends 15 of the box may be trimmed and knife cuts can then be made through the slots 16 downwardly through the meat to the upper surface 11 of the cutting board 10.

The guide box 11 is then removed and turned at right angles with respect to the board 10 and replaced thereupon. Further cuts are then made through the slots 16 and through the meat to the board 10 thus cutting the meat into substantially cubical portions having equal dimensions.

It should be noted that the lower ends 21 of the slots 16 within the end walls 14 terminate just below the upper surface 11' of the board thus ensuring that the knife passes clear through the meat and engages the surface 11' of the cutting board thus severing the meat completely into the required portions.

FIG. 5 shows a plate 22 which can be fitted into any of the slots 16 so that the recessed lower edge 23 rests on the board 10 and the end portions 24, on the supporting surface 12. By using two such plates 22, the meat, if smaller than the area of the board 10, may be restrained from spreading during the cutting action.

Various modifications may be constructed or performed within the scope of the inventive concept disclosed. Therefore what has been set forth is intended to illustrate such concept and is not for the purpose of

What I claim as my invention is:

1. A cutting assembly for steak or similar meat adapted to be placed on a supporting surface, comprising in combination a planar cutting board, an open based box engageable over said board, and a plurality of knife slots in spaced and parallel relationship formed in the upper surface and opposite end walls of said box and terminating spaced from the lower edges of said end walls but below the upper surface of said board when said box is in position over said board, a pair of plates engageable within any two of said slots for restraining the meat and preventing same from spreading during use, said plates being substantially rectangular in front elevation and having a recessed lower edge engaging the upper surface of said board and extending lower edge end portions engaging the supporting surface of said assembly, a pair of plates engageable within any two of said slots for restraining the meat and preventing same from spreading during use, said plates being substantially rectangular when viewed in front elevation and having a recess lower edge engaging the upper surface of said board and extending lower edge end portions engaging within the portions of the slot on said opposite end walls of said box.

* * * * *